US006511603B1

(12) United States Patent
Dietz et al.

(10) Patent No.: US 6,511,603 B1
(45) Date of Patent: Jan. 28, 2003

(54) ALKALINE EARTH CATION EXTRACTION FROM ACID SOLUTION

(75) Inventors: Mark Dietz, Elmhurst, IL (US); E. Philip Horwitz, Naperville, IL (US)

(73) Assignee: Arch Development Corp., Chicago, IL (US)

( * ) Notice: Subject to any disclaimer, the term of this patent is extended or adjusted under 35 U.S.C. 154(b) by 288 days.

(21) Appl. No.: 09/695,126

(22) Filed: Oct. 24, 2000

(51) Int. Cl.[7] .................................................. C02F 1/26
(52) U.S. Cl. ................. 210/685; 210/198.2; 210/502.1; 210/634; 210/656; 210/682; 423/2; 423/157; 423/DIG. 14; 428/403; 428/404; 428/407; 502/401; 588/20
(58) Field of Search .......................... 210/198.2, 502.1, 210/634, 656, 682, 685; 423/2, 157, DIG. 14; 428/403, 404, 407; 502/401; 588/20; 96/101

(56) References Cited

U.S. PATENT DOCUMENTS

| | | | |
|---|---|---|---|
| 5,100,585 A | | 3/1992 | Horwitz et al. |
| 5,110,474 A | | 5/1992 | Horwitz et al. |
| 5,346,618 A | | 9/1994 | Horwitz et al. |
| 5,478,953 A | | 12/1995 | Gula et al. |
| 5,666,641 A | * | 9/1997 | Abney et al. |

OTHER PUBLICATIONS

Benzi, et al., "Radium Removal from Aqueous Solutions by Variously Supported Ligands", *J. Radioanal. Nucl. Chem. Lett.*, 164(4):211–220 (1992).

Horwitz, et al., "A Novel Strontium–Selective Extraction Chromatographic Resin", *Solv. Extr. Ion Exchange*, 10(2):313–336 (1992).

Parrish, "Macroporous Resins as Supports for a Chelating Liquid Ion–exchanger in Extraction Chromatography", *Analyt. Chem.*, 49(8):189–1192 (Jul., 1977).

Parrish, "Measurement of Water Regain and Macropore Volume of Ion–Exchange Resins", *J. Appl. Chem. (London)*, 15:280–288 (1965).

Burnett, et al., "Pre–concentration of actinide elements from soils and large volume water samples using extraction chromatography", *J. Radioanal. Nucl. Chem.*, 226(1–2):121–127 (Aug., 1997).

Dietz and Horwitz, "An Improved Method for the Separation of Lead–210 from Ra–DEF for Radioactive Equilibrium Experiments" *J. Chem. Ed.*, 73(2):182–184 (Feb., 1996).

Horwitz, et al., "Separation and Preconcentration of Strontium from Biological, Environmental, and Nuclear Waste Samples by Extraction Chromatography Using a Crown Ether", *Analyt. Chem.*, 63:522–525 (1991).

Pepper, et al., "Properties of Ion–exchange Resins in Relation to Their Structure. Part IV. Swelling and Shrinkage of Sulphonated Polystyrenes of Different Cross–linking", 3129–3136 (1952).

* cited by examiner

*Primary Examiner*—Betsey Morrison Hoey
(74) *Attorney, Agent, or Firm*—Welsh & Katz, Ltd.

(57) ABSTRACT

An extractant medium for extracting alkaline earth cations from an aqueous acidic sample solution is described as are a method and apparatus for using the same. The separation medium is free of diluent, free-flowing and particulate, and comprises a Crown ether that is a 4,4'(5')[$C_4$–$C_8$-alkylcyclohexano]18-Crown-6 dispersed on an inert substrate material.

35 Claims, 9 Drawing Sheets

ALKALINE EARTH CATION EXTRACTION FROM ACID SOLUTION

GOVERNMENTAL RIGHTS

The U.S. Government has rights in this invention pursuant to Contract No. W-31-109-ENG-38 between the U.S. Department of Energy and the University of Chicago.

TECHNICAL FIELD

The present invention is concerned generally with a method, separation medium and apparatus for selectively extracting alkaline earth cations from acidic aqueous solutions. More particularly, the invention is concerned with a free-flowing separation medium of a Crown ether dispersed onto an inert substrate material, a method for using that separation medium and an apparatus for selectively extracting alkaline earth cations, and particularly strontium cations, from an acidic aqueous sample.

BACKGROUND OF THE INVENTION

Growing public health and safety concerns over the use of nuclear technology, both in the production of power and in the manufacture of nuclear weapons, have made increasingly important reliable methods for the determination of various radiostopes in environmental and biological samples. The beta emitting isotope, $^{90}Sr$, produced by nuclear fission, is of particular concern. Because of its chemical similarity to calcium, $^{90}Sr$ released to the environment can quickly enter the food chain. Ultimately, the $^{90}Sr$ can be permanently incorporated into the inorganic matrix of human bones. There is, therefore, a clear need for an analytical procedure and methodology suitable for use in the routine monitoring of persons whose activities expose them to the risk of internal contamination from this element and for the determination of the levels of radiostrontium in various environmental samples (e.g., soils, plants, natural waters, and waste streams).

Numerous prior methods have been described for performing such determinations. An essential feature of most of these methods is the separation and purification of the strontium, both to remove radioisotopes that can interfere with subsequent beta counting and to free it from the large quantities of inactive substances typically present, particularly calcium.

Typical past methods of separation of Ca and $^{90}Sr$ have relied upon the greater solubility of calcium nitrate in strong nitric acid solutions. This approach ultimately provides satisfactory results but requires numerous process steps, and repeated precipitations must be performed in order to achieve substantially complete recovery of $^{90}Sr$. Other methods of separation involve precipitation of strontium sulfate or strontium rhodizonate, sorption of strontium on an cation exchange resin from a solution of a chelating agent such as CYDTA or EDTA, and liquid-liquid extraction with organophosphorous acids. These methods, however, suffer from serious shortcomings. In the case of the precipitation and extraction methods, the extracted strontium is contaminated with significant amounts of calcium. Cation exchange processes require precise control of pH value due to the narrow range of pH necessary to achieve adequate separation. Moreover, the acceptable pH extraction range is affected by the concentration of calcium present that gives rise to different pH value ranges needed for effectively treating different waste samples.

In the recent past, attempts have been made to use macrocyclic polyethers (Crown ethers) to separate strontium and calcium. Such work has involved a chloroform solution of dicyclohexano-18-Crown-6 to separate strontium traces from macroscopic amounts of calcium cations. This method has also been applied to the determination of the relative amounts of $^{90}Sr$ and $^{89}Sr$ in milk. In another related process, a combined procedure involving cation-exchange/extraction/precipitation has been developed that incorporates the extraction of strontium picrate into a methylene chloride solution of dicyclohexano-18-Crown-6 to isolate traces of strontium from milk and drinking water.

In a related process involving chromatographic separation of alkaline earths, solutions are used consisting of various polyethers in chlorinated hydrocarbons dispersed onto siliconized kieselguhr as a stationary phase. Separation of calcium and strontium proceeds by use of either dibenzo-18-Crown-6 or dicyclohexano-18-Crown-6. Unfortunately, each of these Crown ether-based strontium extraction procedures is wholly ineffective for relatively acidic samples. This is a particularly troublesome shortcoming because it is often most desirable to digest biological or environmental samples or leach the raw sample using an acid to produce a feed solution for extraction, and such a feed solution is often several molar in acid.

Co-assigned U.S. Pat. Nos. 5,100,585, 5,110,474 and 5,346,618 by the present inventors teach the manufacture and use of a chromatographic medium for selectively separating strontium or technetium values from acidic compositions from various sources. The solid phase chromatographic medium made and used in those patents comprised a solution of a Crown ether dissolved in a diluent that was slightly soluble or insoluble in water, but capable of dissolving a substantial quantity of water such as octanol, which solution was itself dispersed onto a solid inert resin substrate material.

A few years after the filing of the applications that became the above U.S. patents, Benzi et al. (1992) *J. Radioanal. Nucl. Chem., Letters,* 164(4):211–220 reported on the use of 18-Crown-6 (18C6), dibenzo-18-Crown-6 (DB18C6) and 24-Crown-8 (24C8) as well as open chain ligands (podans) adsorbed on Amberlite® XAD-4 and XAD-7 resins or Kieselgel as supports for removal of radium cations from aqueous solutions. Those authors reported the supported crown ethers to be inefficient for that extraction, whereas the supported open chain ligands were said to provide satisfactory distribution coefficients for the radium removal.

The above-noted co-assigned patents provided a large technological advance over the liquid-liquid separation techniques that preceded them, and from which their technical advance grew. However, the separation medium of those patents exhibited changes upon elution of the captured strontium cations that minimized their usefulness for a subsequent separation, including loss of diluent to the effluent medium. Still further, the amount of strontium cation-extracting Crown ether present on any given support was limited because of the presence of the diluent.

It would therefore be beneficial to provide a method, separation medium and apparatus for separating alkaline earth cations such as strontium cations from acidic aqueous samples such as biological, commercial waste and environmental samples that do not exhibit the negative attributes of our prior technologies. The method, separation medium and apparatus of the present invention that are described hereinafter can overcome those negative attributes, while maintaining the previously achieved advances.

BRIEF SUMMARY OF THE INVENTION

The present invention contemplates a separation medium, an apparatus for carrying out a separation such as a chromatographic column or cartridge containing the separation medium, and a method of using the separation medium to separate alkaline earth cations, such as barium cations from radium cations, and particularly strontium cations from other alkaline earth cations, present in an acidic aqueous solution. The separation medium comprises free-flowing particles having a di-4,4'(5')[$C_3$–$C_8$-alkylcyclohexano]18-Crown-6, such as di-t-butylcyclohexano-18-Crown-6, that exhibits a partition ratio between n-octanol and 1 M nitric acid ($D_{Crown}$=[Crown$_{Org}$]/[crown]$_{Aq}$) of greater than about $10^3$ and usually of about $10^3$ to about $10^6$ dispersed onto an inert, porous support such as polymeric resin or silica particles. The separation medium is free of a diluent, and particularly free of a diluent that is (i) insoluble or has limited (sparing) solubility in water and (ii) capable of dissolving a substantial quantity of water.

A separation apparatus for extracting alkaline earth cations from an acidic aqueous solution comprising the above separation medium in a support vessel is also contemplated. A contemplated apparatus has a fluid inlet and fluid outlet and one or more porous supports within the vessel for maintaining the separation medium in a desired position. A contemplated support vessel is typically glass or plastic such as polyethylene or polypropylene and is typically a chromatographic column or cartridge.

A method for separating alkaline earth cations such as strontium cations from an acidic aqueous sample is also contemplated. In accordance with this method, a free-flowing separation medium of a before-described di-4,4'(5') [$C_3$–$C_8$-alkyl-cyclohexano]-18-Crown-6 such as di-t-butylcyclohexono-18-Crown-6 dispersed onto an inert, porous support such as a resin material is contacted with an aqueous acidic sample containing dissolved alkaline earth metal cations, such as strontium cations. The separation medium is free of a diluent as noted before. The contact is maintained for a time period sufficient for the alkaline earth cations to be extracted from the sample solution to the separation medium to form a solid phase-loaded separation medium and a liquid phase alkaline earth cation-depleted sample. The solid and liquid phases are thereafter separated.

In preferred practice, the alkaline earth cations are selectively eluted from the loaded separation medium by contacting the loaded separation medium with an aqueous solution having a pH value of about 1 or greater and a nitrate anion concentration of about 0.1 M or less. It is also preferred that the original contacting step be carried out in a before-described separation apparatus such as a chromatographic separation column or cartridge by passing the acidic aqueous sample into the separation apparatus to contact the separation medium therein, and that the elution of alkaline earth cations be carried out by passing an aqueous solution of pH 1 or greater through the loaded separation medium in the separation apparatus.

The present invention has several benefits and advantages.

One benefit of the invention is the separation medium that is free of previously used diluent that can contaminate an alkaline earth cation-containing effluent.

An advantage of the invention is an improved method and apparatus for extracting alkaline earth cations such as strontium cations dissolved in a strongly acidic solution.

Another benefit of one aspect of the invention is the higher loading of extractant Crown ether on the separation medium that can be achieved in the absence of diluent that leads to a greater capacity of the separation medium particles.

Another advantage of one aspect of the invention is that substantially greater partition ratios for barium can be achieved using the new separation medium, while maintaining a desired difference in partition ratios between barium and radium cations.

Still another benefit of the invention is that prolonged washing of the separation medium with 1 M nitric acid does not appear to affect the elution profile of subsequently loaded separation medium particles.

Still further benefits and advantages will be apparent to the skilled worker from the disclosure that follows.

BRIEF DESCRIPTION OF THE DRAWINGS

In the drawings forming a portion of this disclosure, and in which like last two digit numbers indicate like structures.

In FIG. 5A, the values shown were recalculated and plotted using the data from Horwitz et al., (1992) *Solvent Extr. Ion Exch.*, 10(2):313–336; values for strontium cations are shown as closed circles, values for barium cations are shown as open circles, values for radium are shown as closed squares, whereas values for calcium are shown as open squares. In FIG. 5B, values are similarly represented.

DETAILED DESCRIPTION OF THE INVENTION

Figure 1:
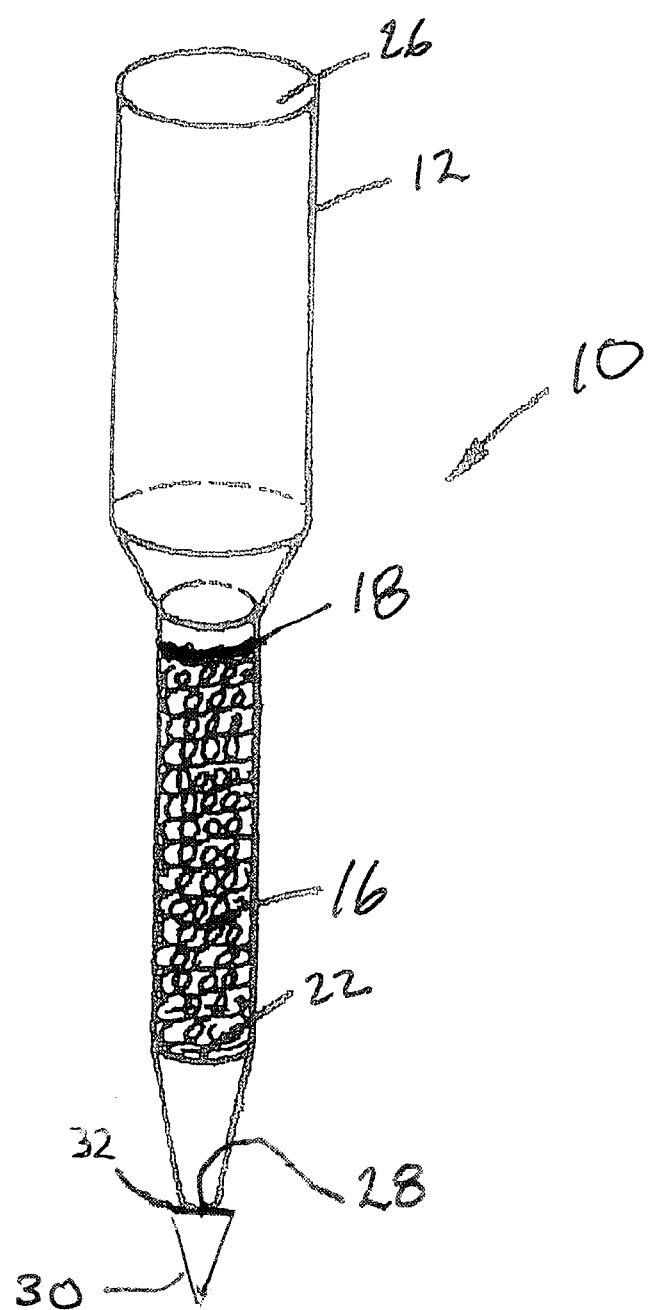
FIG. 1 shows a schematic representation of a separation vessel useful in an embodiment of the invention.

The present invention contemplates a separation medium, an apparatus for selectively extracting alkaline earth cations from an acidic aqueous solution such as a chromatographic column or cartridge containing that separation medium, and a method for separating alkaline earth metal cations from an acidic aqueous sample using that separation medium. The present invention is particularly efficient for separation of barium from radium cations, and strontium cations from one or more of the other alkaline earth cations. The alkaline earth metal cations that are extractable are calcium, strontium, barium and radium, whereas magnesium and beryllium cations are not readily extractable using the separation medium, method or apparatus contemplated herein. Thus, selective extraction of alkaline earth cations refers herein to cations of one or more of calcium, strontium, barium and radium.

A contemplated separation medium is free-flowing and particulate, and comprises an inert, porous support onto which is adsorbed a Crown ether extractant. A contemplated support is inert in that it does not react with the aqueous acid such as the aqueous nitric acid that is present in a contemplated separation, the adsorbed Crown ether or the alkaline earth cations.

A contemplated support has sufficient porosity that it can adsorb Crown ether extractant in an amount of 5 to about 50 weight percent of the total separation medium weight and still remain free-flowing when dry. The Crown ether is more preferably present at about 10 to about 40 weight percent of the separation medium, and more preferably still at about 20 to about 40 weight percent. By "dry", it is meant that the separation medium loses less than 5 weight percent after being held at a temperature of 50° C. at a pressure of 0.1 mm of mercury for 24 hours. A contemplated support is also preferably particulate.

A contemplated inert, porous support is itself preferably free-flowing when dry, and can be made of a variety of materials, including silica and polymeric resin. By "free-flowing", it is meant that the support and separation medium are pourable particles that are free from substantial clumping. Thus, for example, a beaker of dry contemplated support particles or dry separation medium particles pours much like dry silica gel powder used for column chromatography.

Exemplary silica-based support particles are available from Sigma Chemical Co. (St. Louis, Mo.) under the designation controlled-pore glass and controlled-pore glyceryl-glass. These materials are available in varying mesh sizes from 20–80 to 200–400 and in varying nominal pore sizes from 75 through 3000 Å. Useful trimethylsilyl-bonded porous silica particles are available from Alltec Associates, Deerfield, Ill. These particles have a nominal pore size of 300 Å and are available in 90–130, 20–50 and 35–70 micron diameters.

Exemplary useful polymeric resins include the Amberlite® polyaromatic resins such as those sold under the designations XAD-4, XAD-8, XAD-11 and XAD-16, and the acrylic resin sold under the designation XAD-7 by Rohm and Haas Co., Philadelphia, Pa. are available in 20–60 mesh size. These resin particles are said to have the following average pore diameters and surface areas: XAD-4 40 Å and 725 $m^2/g$; XAD-7 90 Å and 450 $m^2/g$; XAD-16 100 Å and 800 $m^2/g$, and are referred to in the art as macroreticular resins. The spherical rigid bead macroreticular Amberchrom® resins such as those sold under the designations CG-161, CG-300, CG-100 for styrene/divinyl benzene-containing materials, and CG-71 for a methacrylate/dimethacrylate-containing material are also useful. These latter resin particles are commercially available from TosoHaas, Montgomeryville, Pa. Each of the latter four resins is available in three particle size ranges: "s" or superfine at 20–50 µm, "m" or medium at 50–100 µm, and "c" or coarse at 80–160 µm. Typical resin particles are reported to have the following average pore sizes and surface areas: CG-161 150Å and 900 $m^2/g$; CG-300 300 Å, 700 $m^2/g$; CG-1000 1000 Å and 200 $m^2/g$; and CG-71 250 Å and 500 m2/g. It is understood that the Amberlite® XAD-7 and Amberchrom® CG-71 are chemically similar materials, as are Amberlite® XAD-4 and Amberchrom® CG-161 also chemically.

A contemplated polymeric resin support is typically sufficiently hydrophilic and wettable that when placed in distilled water and shaken, the resin sinks rather than floats. A more quantitative determination of a satisfactory support can be found in the water regain values discussed in Parrish (1977) *Analyt. Chem.*, 49(8): 1189–1192 and Parrish (1965) *J. Appl. Chem. (London)*, 15: 280–288. Using water regain values, a contemplated resin exhibits a water regain value greater than about 0.75, and less than about 3.5. A preferred resin exhibits a water regain value of about 1 to about 2.5, and more preferably about 1.75 to about 2.25.

A contemplated extractant is a di-4,4'(5')[$C_3$–$C_8$-alkylcyclohexano]18-Crown-6 that exhibits a partition ratio between n-octanol and 1 M nitric acid of greater than about $10^3$, and usually of about $10^3$ to about $10^6$, and more preferably about $10^4$ to about $10^5$. Exemplary $C_3$–$C_8$-alkyl groups include but are not limited to propyl, iso-propyl, butyl, sec-butyl, tert-butyl, pentyl, hexyl, heptyl, octyl, cyclopentyl, cyclohexyl, cycloheptyl, cyclooctyl, 4-methylcyclohexyl and the like. A particularly preferred extractant is di 4,4'(5')[t-butylcyclohexano]18-Crown-6 (also referred to hereinafter as either di-t-butylcyclohexano-18-Crown-6 or as DtBuCH18C6). Exemplary Crown ethers can be prepared as discussed in Gula et al. U.S. Pat. No. 5,478,953 and the citations therein.

Macrocyclic polyethers such as cis-dicyclohexano-18-Crown-6 (also referred to hereinafter as DCH18C6) and di-methylcyclohexano-18-Crown-6 (also referred to hereinafter as DMeCH18C6) are not useful herein. Crown ethers such as DCH18C6 and DMeCH18C6 are less hydrophobic than DtBuCH18C6 and exhibit too low a partition ratio for extraction between n-octanol and 1 M nitric acid solution to be useful herein.

Exemplary partition ratios at three nitric acid concentrations are shown for DCH18C6, DMeCH18C6 and DtBuCH18C6 are in the table below. As will be seen, DtBuCH18C6 consistently exhibited a partition ratio that was about one hundred times greater than either DCH18C6 or DMeCH18C6, thereby indicating a lesser propensity for appreciable aqueous complex formation with strontium cations and a more stable separation medium.

Partition Ratios of 18C6 Derivatives Between n-Octanol and Nitric Acid Solutions (25° C.)

| Crown Ether | $D_{Crown}$ in Nitric Acid | | |
|---|---|---|---|
| | 0.01 M | 0.1 M | 1 M |
| DCH18C6 | $1.2 \times 10^2$ | $1.1 \times 10^2$ | $5.3 \times 10^1$ |
| DMeCH18C6 | $8.5 \times 10^2$ | $8.1 \times 10^2$ | $3.1 \times 10^2$ |
| DtBuCH18C6 | $3.0 \times 10^4$ | $3.1 \times 10^4$ | $1.3 \times 10^4$ |

A contemplated separation medium is free of any diluent when used for separations. More particularly, a contemplated separation medium is free of a diluent that is (i) insoluble or sparingly soluble in water and (ii) capable of dissolving a substantial quantity of water. Such diluents for the Crown ethers were required and are explained in detail in the before-mentioned U.S. Pat. Nos. 5,110,474 and No. 5,346,618, and were used in conjunction with extractants in our U.S. Pat. No. 5,100,585. Generally, the diluents were described as organic compounds having a boiling point at one atmosphere of about 170° to about 200° C., limited or no solubility in water, capable of dissolving about 0.5 to 6 M water and also dissolving the Crown ether. Such diluents include alcohols, ketones, carboxylic acids and esters.

Figure 3:
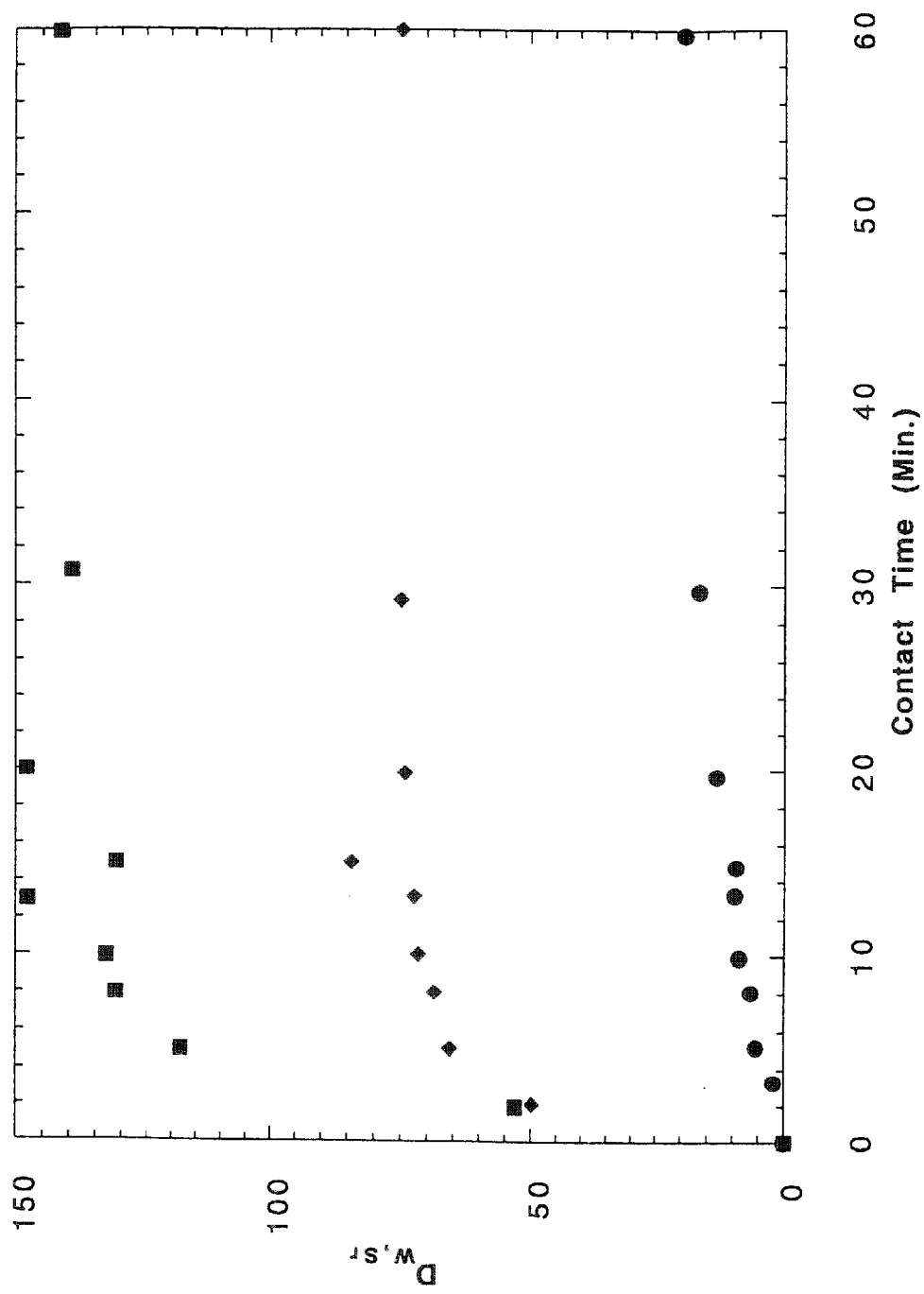
FIG. 3 is a graph that illustrates the kinetics and equilibrium $D_{w,Sr}$ values obtained using separation media containing DtBuCH18C6 adsorbed on three different support particles: Amberchrom® CG-71 (closed squares), trimethylsilylated silica (closed diamonds) and Amberlite® XAD-2 (closed circles). Data were determined in 2 M $HNO_3$ at the contact times indicated.

FIG. 3 illustrates the kinetics and equilibrium $D_{w,Sr}$ values obtained using different support media and a constant amount of extractant Crown ether (DtBuCH18C6) for the extraction of strontium cations from an acidic aqueous sample. As can be seen from the data, use of Amberlite® XAD-2 resin that exhibits a water regain value of 0.65–0.70 in the above-noted study in Parrish (1977) *Analyt. Chem.*, 49(8): 1189–1192 provided poor extraction compared with Amberchrom® CG-71 that is understood to be substantially similar to Amberlite® XAD-7 that exhibited a water regain value of 1.89–2.13 in that published study. The silica particles exhibited useful values that were intermediate between the two other values. Each of the silica- and Amberchrom® CG-71/Amberlite® XAD-7-type particles reached its equilibrium value within about 20 to about 30 minutes of contact time, whereas the particles based on Amberlite® XAD-2 required up to about 60 minutes to reach equilibrium. Other data obtained using separation particles of U.S. Pat. No. 5,346,618 that contained about 20 weight percent n-octanol and about 20 weight percent DtBuCH18C6 on Amberchrom® CG-71 reached equilibrium after about 20 minutes as did separation medium particles contemplated herein that contained about the same amount of DtBuCH18C6 on Amberchrom® CG-71, but lacked the n-octanol diluent.

For best results in separation, a contemplated separation medium is used at only about 10 percent of its cation loading capacity. A contemplated separation medium typically has an alkaline earth cation capacity of about 10 mg/mL of bed volume. The actual capacity can vary with the separation medium particle size, weight percent loading of the Crown ether and alkaline earth cation.

A typical, preferred separation medium was prepared as follows. Raw inert, free-flowing particulate support particles such as Amberlite® XAD-7 or Amberchrom® CG-71 resins were treated in a conventional manner to remove traces of preservatives and unreacted monomers as discussed in U.S. Pat. No. 4,835,107. A known amount of the purified resin substrate material was slurried in methanol and a desired loading Crown ether extractant such as DtBuCH18C6 in methanol, hexane or other easily removable solvent; i.e., a solvent with a boiling point of less than about 120° C. at one atmosphere, was added. The resulting mixture was gently stirred for several minutes, and the methanol (hexane or other removable solvent) was removed under reduced pressure at 40° C. to yield the free-flowing, particulate (readily pourable particles) separation medium having the Crown ether dispersed (adsorbed) on the resin support material. Contrary to our prior separation medium of U.S. Pat. Nos. 5,100,585, 5,110,474 and 5,346,618, the separation medium so prepared is free of a diluent that is (i) insoluble or slightly soluble in water and (ii) capable of dissolving a substantial quantity of water with the Crown ether soluble therein.

Figure 4:
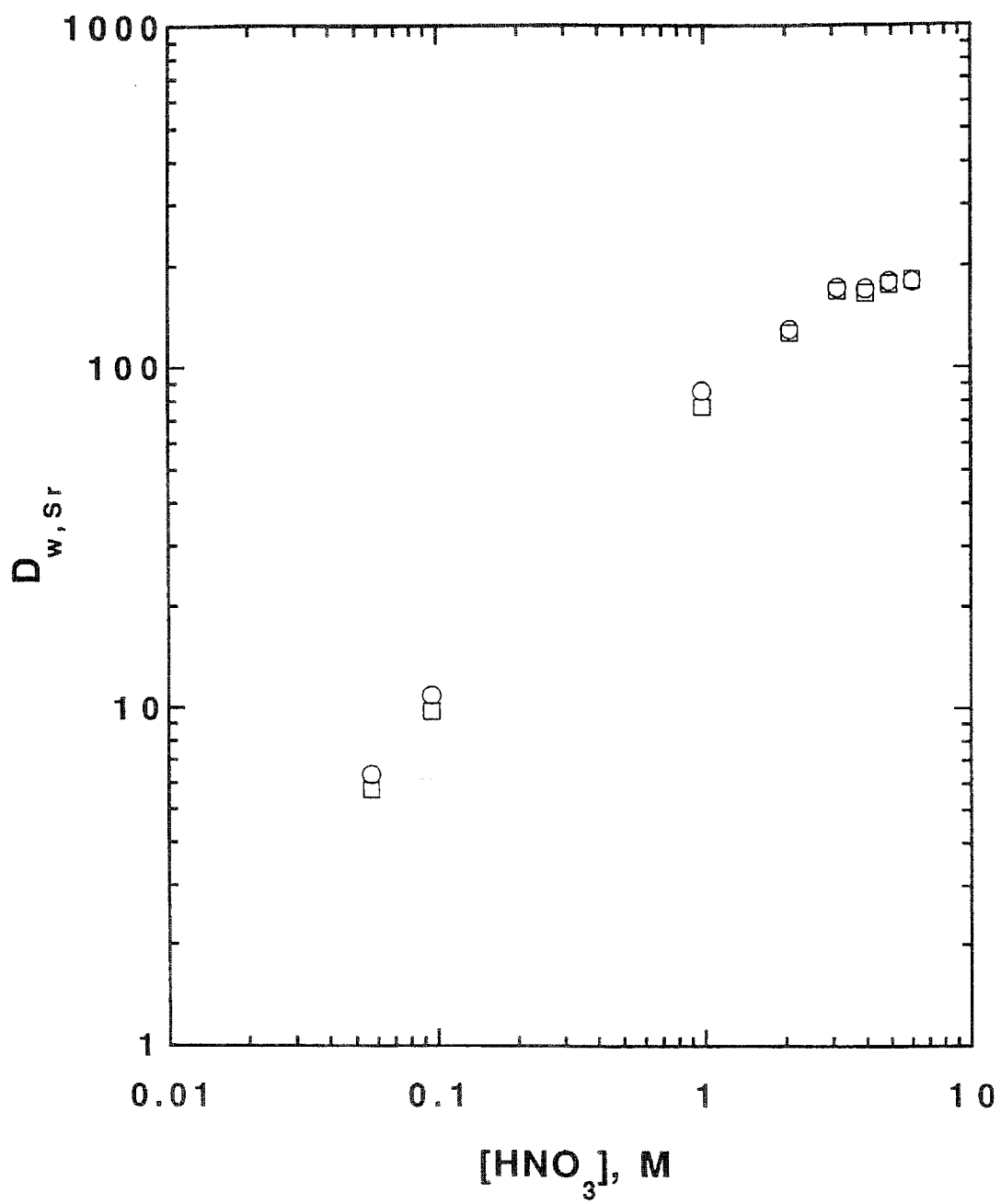
FIG. 4 is a graph of $D_{w,Sr}$ values versus $HNO_3$ concentration for separation medium particles prepared using about 20 weight percent DtBuCH18C6 adsorbed on Amberchrom® CG-71 resin in which the Crown ether was initially dissolved in methanol (open squares) or hexane (open circles).

A strontium cation extraction study was carried out using separation particles containing the same amount of the same Crown ether (about 20 weight percent DtBuCH18C6) on the same resin support (Amberchrom® CG-71) that were prepared using methanol or hexane as the removable solvent for the Crown ether. That study showed that the extraction results as $D_{w,Sr}$ values were substantially the same using either solvent. These results are shown in FIG. 4.

Figure 5A:
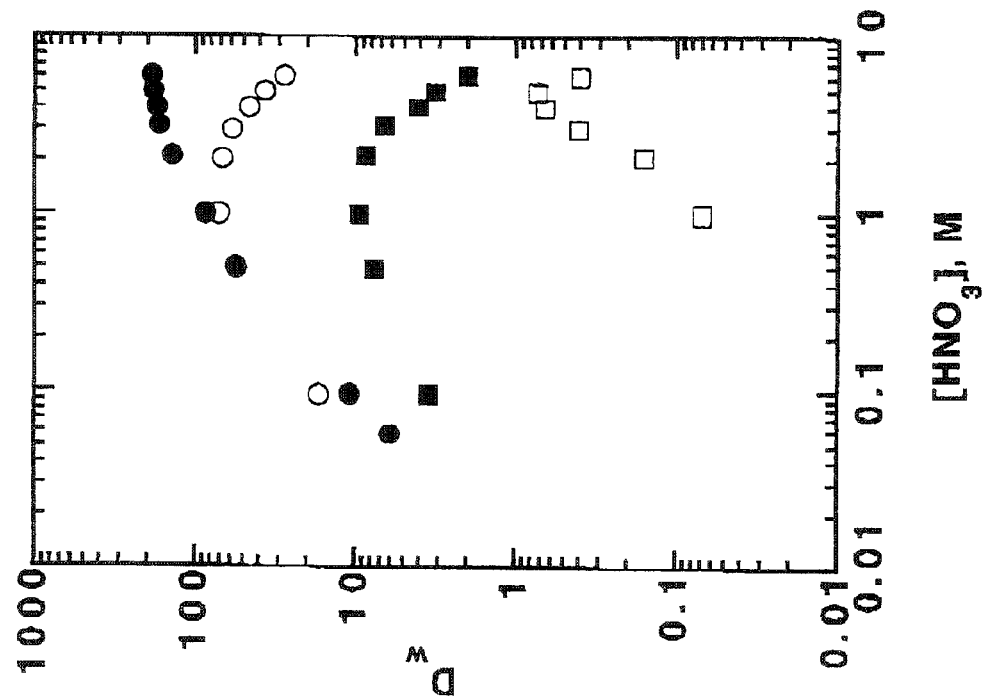
FIGS. 5A and 5B show the nitric acid dependency of $D_w$ values for alkaline earth cations using extraction particles of U.S. Pat. No. 5,346,618 that contained about 20 weight percent each of n-octanol and DtBuCH18C6 (FIG. 5A) on resin, or separation medium particles contemplated herein that contained about 20 weight percent DtBuCH18C6 adsorbed on Amberchrom® CG-71 resin (FIG. 5B).
Figure 5B:
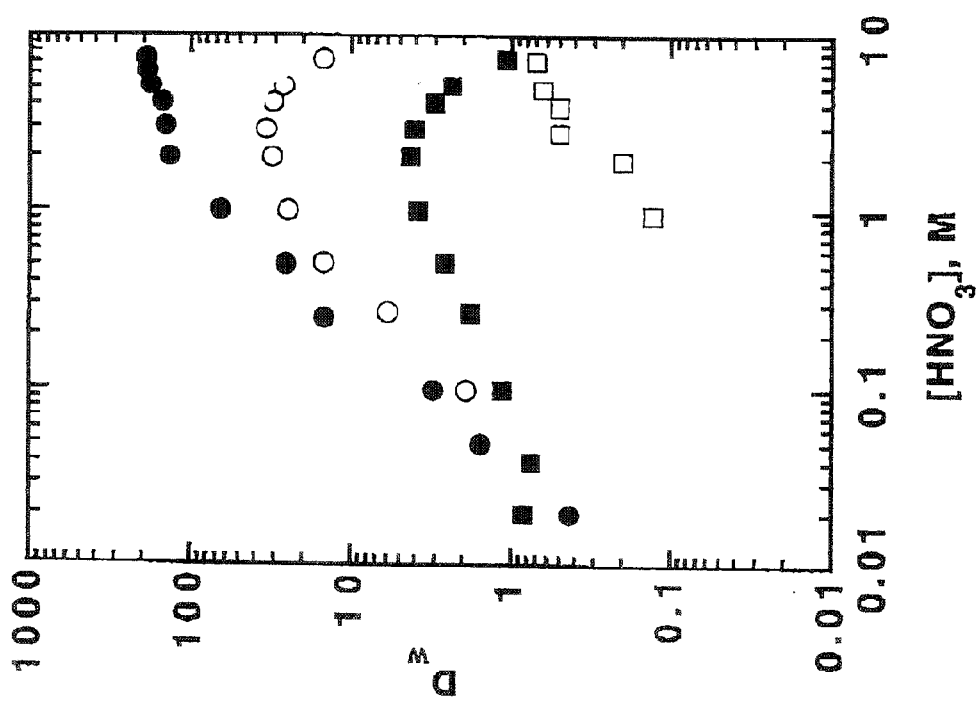

FIG. 5B is a graph that illustrates partition ratios ($D_w$) obtained for four alkaline earth cations (Sr, Ba, Ra and Ca) at varying concentrations of nitric acid using a separation medium contemplated herein. The separation medium used for these studies contained about 20 weight percent of DtBuCH18C6 as the Crown ether on Amberchrom® CG-71 resin support particles. For purposes of comparison, FIG. 5A is a similar graph of recalculated and replotted $D_w$ data for the same alkaline earth cations taken from FIG. 1 of Horwitz et al. (1992) *Solvent Extr. Ion Exch.*, 10(2): 313–326 for extractant particles of U.S. Pat. No. 5,346,618 that contained about 20 weight percent each of n-octanol and DtBuCH18C6 (FIG. 5A) on resin.

Figure 6A:
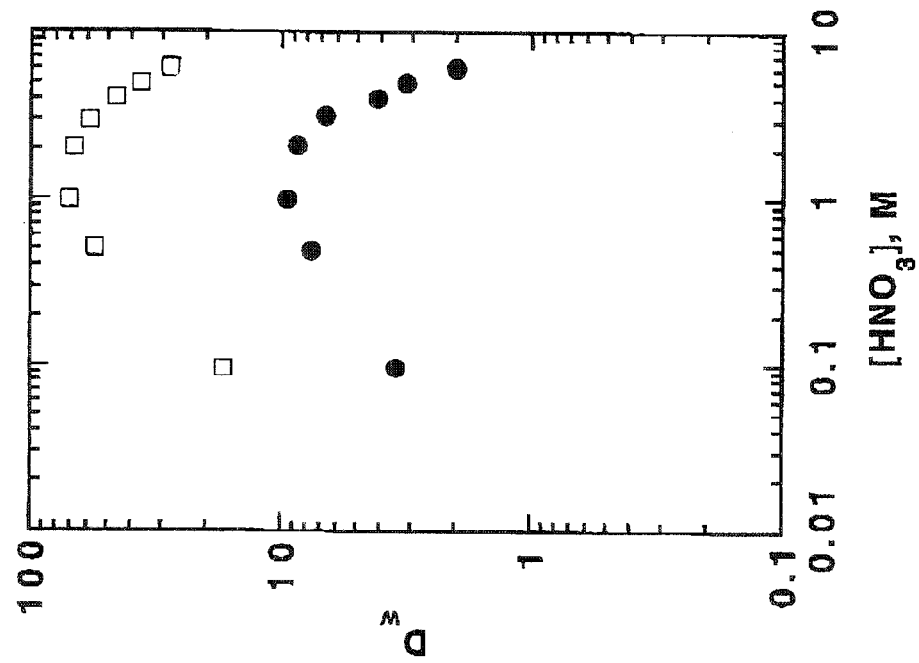
FIGS. 6A and 6B are graphs showing the nitric acid dependency of barium and radium cation sorption ($D_w$ values) by extraction particles of U.S. Pat. No. 5,346,618 that contained about 20 weight percent DtBuCH18C6 and about 20 weight percent n-octanol adsorbed on Amberchrom® CG-71 (FIG. 6A), and separation medium particles contemplated herein that contained about 20 weight percent DtBuCH18C6 adsorbed on Amberchrom® CG-71 (FIG. 62). In each graph, values for barium are shown as open squares, whereas those for radium are shown as closed circles.
Figure 6B:
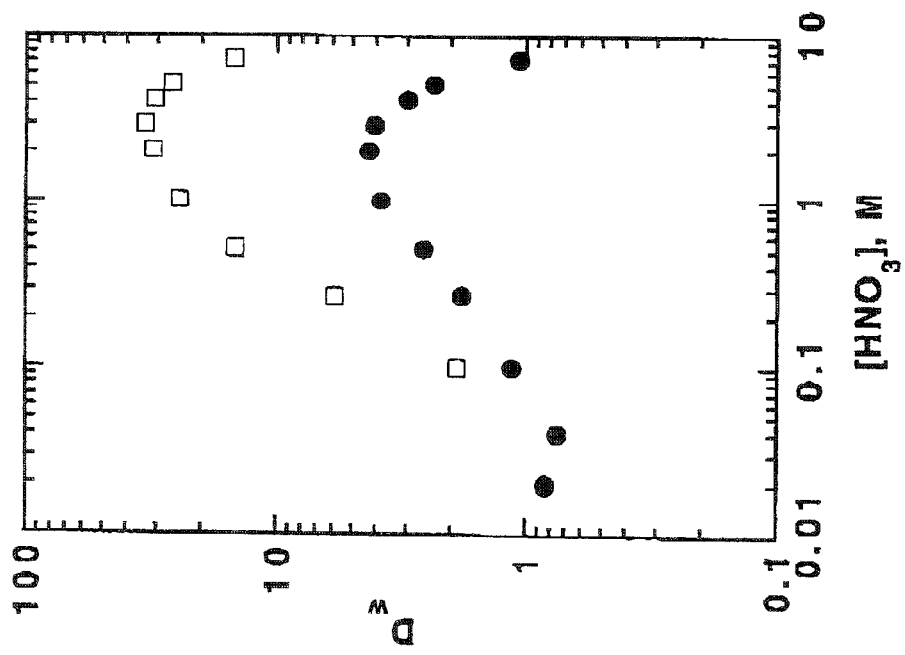

FIGS. 6A and 6B are graphs of $D_w$ values as a function of nitric acid concentration for barium and radium cations using the prior separation particles of U.S. Pat. No. 5,346,618 (FIG. 6A) having about 20 weight percent each of DtBuCH18C6 and n-octanol adsorbed on Amberchrom® CG-71, and a separation medium particles contemplated herein (FIG. 6B) that contain about 20 weight percent DtBuCH18C6 as the Crown ether extractant adsorbed on Amberchrom® CG-71 particles. As will be seen from the data, a separation medium contemplated herein is able to retain barium about 4-times more strongly at 0.5 M $HNO_3$ ($D_{w,Ba}$=56) than the prior separation particles ($D_{w,Ba}$=14). That enhanced retention was achieved while the selectivity for barium over radium cations was maintained at a factor of about 6.

Figure 7:
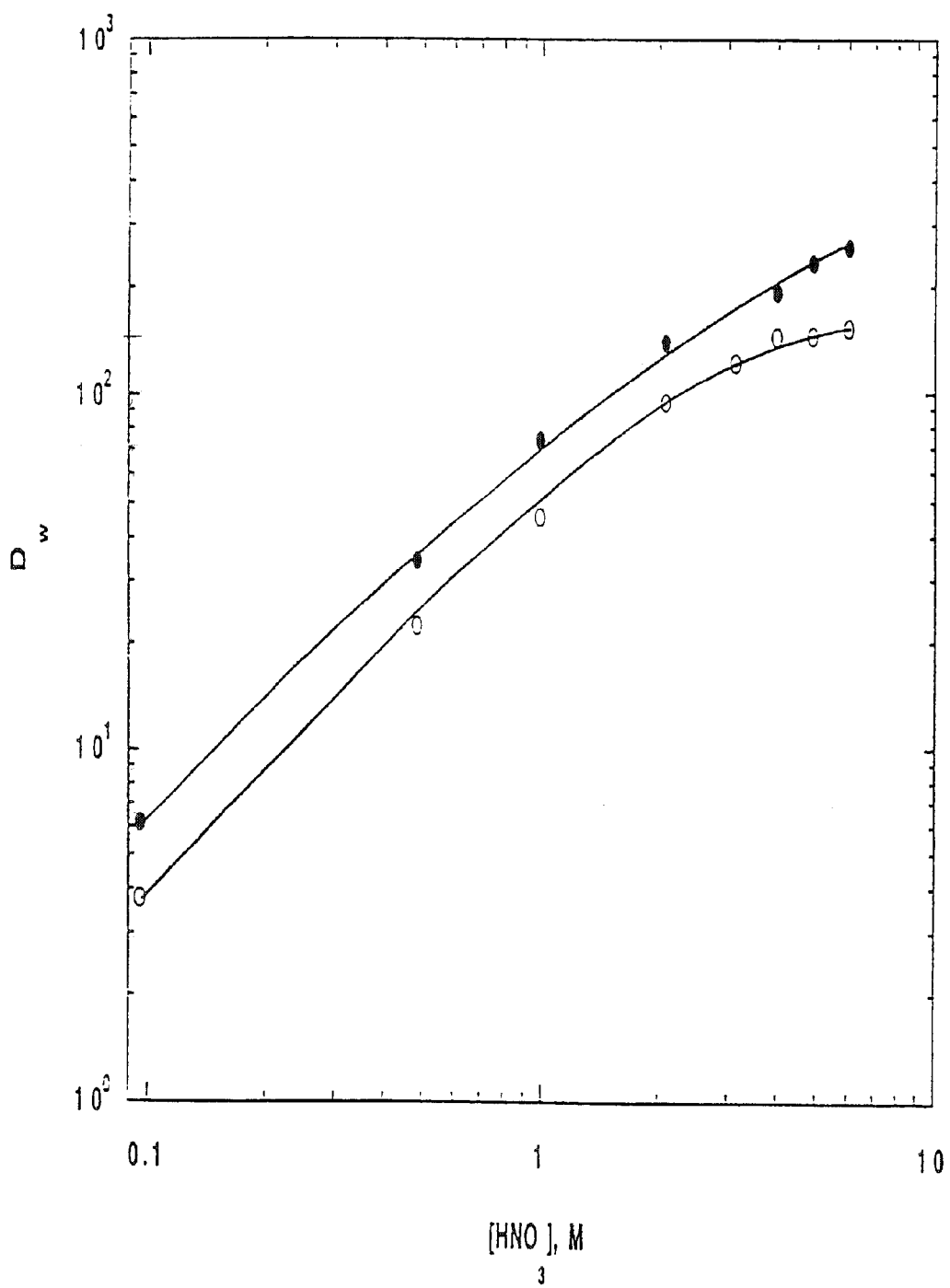
FIG. 7 is a graph that illustrates the nitric acid dependency of $D_{w,Sr}$ for the extraction particles of U.S. Pat. No. 5,346,618 as in FIG. 6A (open ovals) and separation medium particles contemplated herein that contained about 40 weight percent DtBuCH18C6 adsorbed on Amberchrom® CG-71.

FIG. 7 illustrates the strontium cation extraction by prior separation particles of U.S. Pat. No. 5,346,618 that contained about 20 weight percent each of DtBucH18C6 as the Crown ether extractant and n-octanol on Amberchrom® CG-71 resin particles, and a separation medium contemplated herein that contained about 40 weight percent of the same Crown ether on the same support but with no octanol or other such diluent. As is seen, the strontium cation uptake by the separation medium particles contemplated herein is greater over the entire range of nitric acid concentrations studied, while being sufficiently weak at low acid concentrations to permit ready removal.

Figure 8:
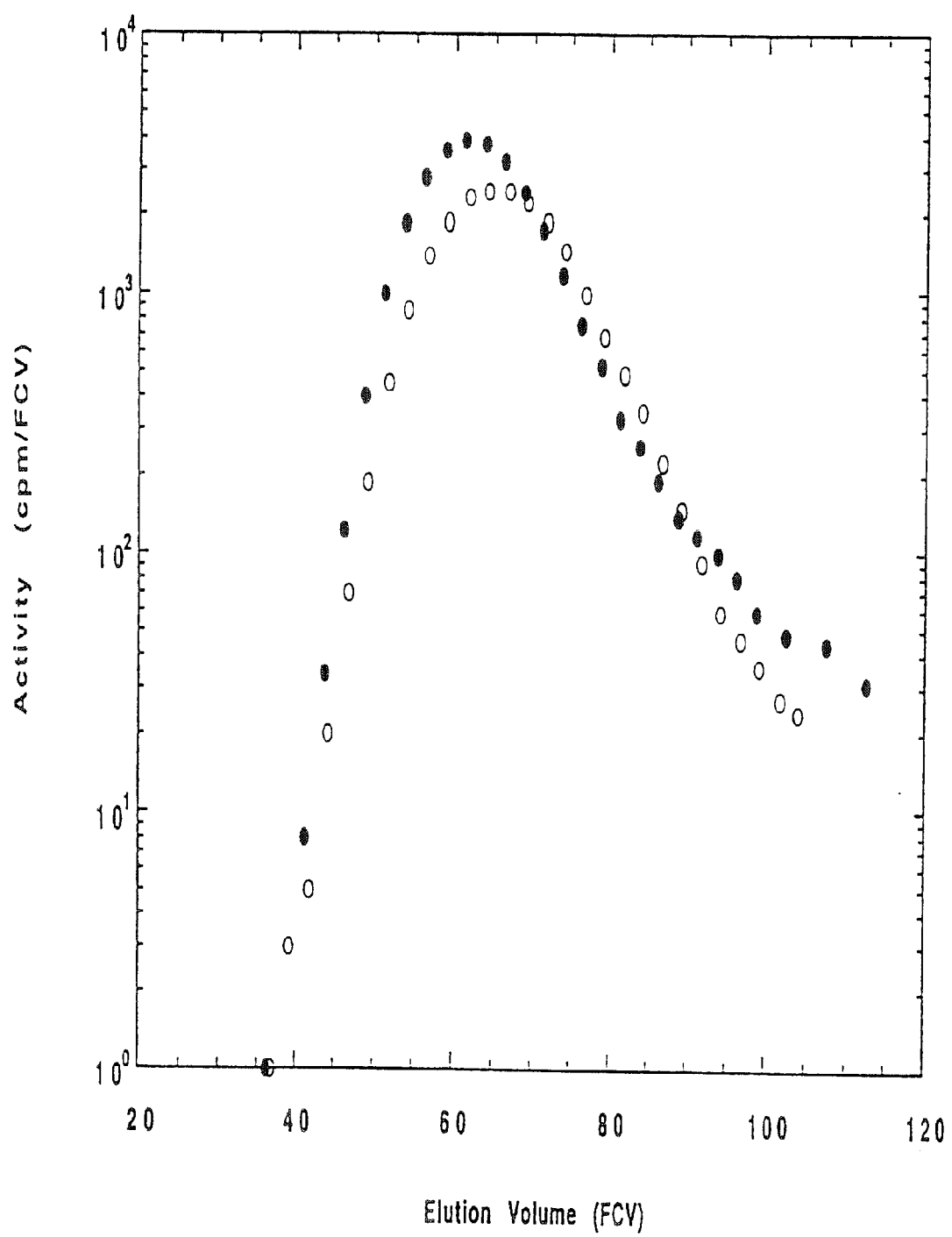
FIG. 8 is a graph that illustrates the elution profiles between 20 and 120 free column volumes (FCV) of eluant for the extraction particles of U.S. Pat. No. 5,346,618 as in FIG. 6A (open ovals) and separation medium particles contemplated herein that contained about 20 weight percent DtBuCH18C6 adsorbed on Amberchrom® CG-71 (closed ovals) using 3 M $HNO_3$ as eluant.

FIG. 8 is a graph that compares the elution profiles of strontium-loaded separation particles of U.S. Pat. No. 5,346, 618 and the strontium-loaded separation medium contemplated herein. The particles of U.S. Pat. No. 5,346,618 contained about 20 weight percent each of DtBuCH18C6 as the Crown ether extractant and n-octanol as diluent on Amberchrom® CG-71 resin particles. The separation medium contemplated herein contained about 20 weight percent of the same Crown ether on the same resin support, in the absence of octanol or other such diluent. Here, the counts of Sr-85 loaded on the prior particles (open ovals) and loaded on contemplated separation medium particles (closed ovals) are compared for elutions of 20 to 120 free column volumes (FCV) of 3 M $HNO_3$. As is seen, there was substantially no difference in the elution profiles.

Figure 9B:
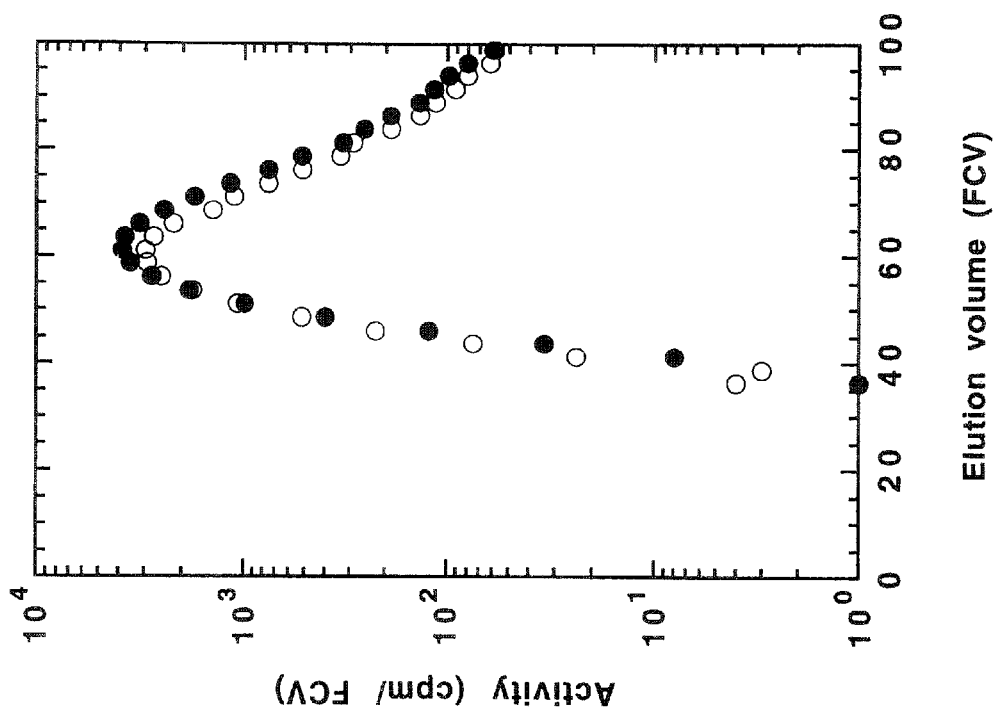
FIGS. 9A and 9B are graphs that illustrate the effect of column washing on the elution of strontium cations on the extraction particles of U.S. Pat. No. 5,346,618 that contained about 20 weight percent each n-octanol and DtBuCH18C6 (FIG. 9A) and separation medium particles contemplated herein that contained about 20 weight percent DtBuCH18C6 adsorbed on Amberchrom® CG-71 (FIG. 9B). Following loading of the resin particles contained in chromatographic columns with Sr-85, strontium ions were eluted from each column with 1 M $HNO_3$ (closed circles). Each of the columns was washed using 1 M $HNO_3$ as the wash solution (250 FCV for FIG. 9A or 261 FCV for FIG. 9B). The loading and elution of Sr-85 was repeated (open circles).
Figure 9A:
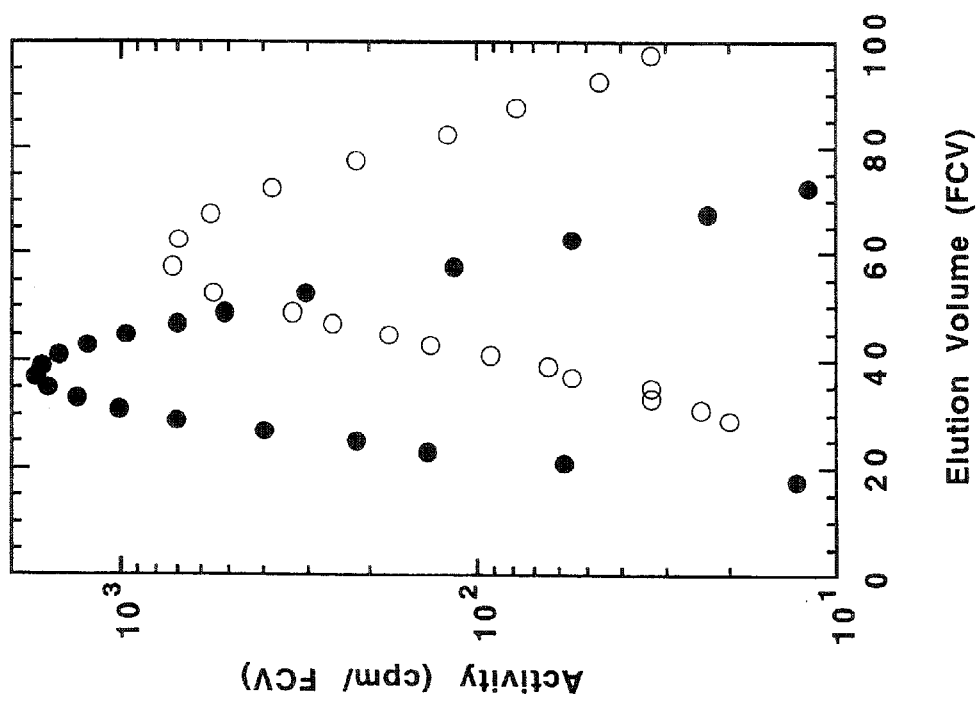

On the other hand, the graphs of FIGS. 9A and 9B show the effects of 1 M $HNO_3$ washing on prior, diluent-containing separation particles of U.S. Pat. No. 5,346,618 (FIG. 9A) and on a separation medium contemplated herein (FIG. 9B). Each graph shows counts of Sr-85 eluted from unwashed particles (closed circles) and particles washed (open circles) with 250 or 261 free column volumes (FCV), respectively, prior to reloading with strontium cations and re-elution.

As is seen, prior, solvent-containing particles were affected by the acid wash, whereas there was substantially no change in the contemplated diluent-free separation medium particles. This great difference in elution profiles indicates that diluent-free separation medium particles contemplated herein can be reused with little if any ill effect on elution, whereas the prior particles containing a solvent could not be so used because of the great change in elution that could occur.

A method for separating alkaline earth cations such as strontium cations from an acidic aqueous sample is also contemplated. In accordance with this method, a free-flowing separation medium of a before-described di-4,4'(5') [$C_3$–$C_8$-alkylcyclohexano]-18-Crown-6 such as a preferred di-t-butylcyclohexano-18-Crown-6 that is dispersed onto an inert, porous, particulate support such as a resin substrate material is contacted with an aqueous acidic sample that contains dissolved alkaline earth cations. The contact is typically carried out at an acidity (nitric acid concentration) near the maximum for the cation(s) to be separated (extracted). For example, as is seen from FIG. 5B, a typical separation medium reaches maximal extraction at about 1 to about 5 M HNO3. The separation medium is free of a diluent, and particularly a diluent that is (i) insoluble or sparingly (slightly) soluble in water, and (ii) capable of dissolving a substantial quantity of water while the Crown ether is dissolved in the diluent. That contact is maintained for a time period sufficient for the alkaline earth cations such as strontium cations to be extracted from the sample solution to the separation medium to form a solid phase-loaded separation medium and a liquid phase alkaline earth cation-depleted sample. The solid and liquid phases are thereafter separated.

A contemplated acidic aqueous sample can be an acidified urine or fecal sample, soil or the like that has been reacted with nitric acid to form a nitric acid extract. Methods for preparing acidic aqueous samples are well known. Some methods for preparing acidic aqueous samples are discussed in the before-mentioned U.S. Pat. Nos. 5,100,585, 5,110,474 and 5,346,618. Another method that is useful for soil is found in Burnett et al., (1997) *J. Radioanal. Nucl. Chem.*, 226(1–2): 121–127. Where the alkaline earth cation to be separated is radioactive, an acidic aqueous sample can contain as little as about $10^{-7}$ to about $10^{-8}$ Molar cation.

Extraction of the alkaline earth cations from the solution to the separation medium to form a solid phase-loaded separation medium is typically a rapid event. Thus, gravity feed of an alkaline earth cation-containing aqueous sample solution through a usually dimensioned chromatographic column containing the separation medium with no retardation of the flow rate typically provides a sufficient contact maintenance time. Swirling of the sample solution and separation medium for a few minutes in a flask or beaker is also typically sufficient contacting.

Separation of the solid and liquid phases is also readily achieved. Where a column or cartridge is used as the separation apparatus, passage of the liquid phase alkaline earth cation-depleted sample out of the vessel is sufficient to effect the desired solid/liquid phase separation. Where a beaker, flask or other vessel is used for the separation, simple decantation can be used to effect the separation of phases. One can also use aqueous $Al(NO_3)_3$ in a wash or rinsing step to assist in eluting interfering cations that may be maintained in the load solution present in the interstices between particles.

In preferred practice, the desired separated alkaline earth cations are selectively eluted from the loaded separation medium by contacting the loaded separation medium with an aqueous solution having a pH value of about 1 or more, or with plain distilled or deionized or even tap water. The elution solution need not be distilled or deionized water, although such water is preferred. Typically, water having a pH value of greater than about 2, and preferably greater than about 3, is utilized to elute alkaline earth metal cations from the separation medium. The concentration of nitrate anions is also preferably less than or equal to about 0.1 molar.

The contacting of the separation medium with the aqueous acidic alkaline earth cation-containing sample can be carried out in an open or closed vessel in which the solid and liquid are swirled or stirred together. It is more preferred, however, that that contacting step be carried out in a below-described support vessel such as a chromatographic separation column or cartridge by passing the aqueous acidic sample solution through the vessel, and that the preferred elution of alkaline earth cations be carried out by passing water or dilute nitric acid (at a concentration of about 0.05 M or less) through the loaded separation medium in the support vessel.

An apparatus for separating alkaline earth cations such as strontium cations from an acidic aqueous solution comprising the above separation medium in a support vessel is also contemplated. A contemplated support vessel is typically glass or plastic such as polyethylene or polypropylene and is typically a chromatographic column or cartridge. A contemplated vessel can include one or more inlets, outlets, valves such as stopcocks and similar appendages.

One contemplated support vessel is cylindrical and has an inlet for receiving an aqueous sample solution prior to contact of the sample solution with the contained separation medium and an outlet for the egress of water after contact with the medium. When the support vessel is a glass or plastic chromatographic column or cartridge, the vessel can contain appropriate valves such as stopcocks for controlling aqueous flow, as are well-known, as well as connection joints such as Luer fittings. The inlet for receiving an aqueous liquid sample solution and outlet for liquid egress can be the same structure as where a beaker, flask or other vessel is used for a contemplated separation process, but the inlet and outlet are typically different and are separated from each other. Usually, the inlet and outlet are at opposite ends of the apparatus.

FIG. 1 provides a schematic drawing of one preferred separation apparatus. Here, the separation apparatus 10 is shown to include a support vessel as a column 12 having an inlet 26 and an outlet 28 for liquid such as water. The outlet has an integral seal and is separable from the seal at a frangible connection 32. The separation apparatus 10 contains one or more flow-permitting support elements. In one embodiment, a frit 22 supports separation medium 16, and an upper frit 18 helps to keep the separation medium in place during the introduction of an influent of aqueous sample or eluting solution. Contemplated frits can be made of glass or plastic such as high density polyethylene (HDPE). A HDPE frit of 35–45 μm average pore size is preferred. A contemplated apparatus can also include a stopcock or other flow regulating device (not shown) at, near or in conjunction with the outlet 28 to assist in regulating flow through the apparatus.

An above-described chromatographic column is typically offered for sale with a cap (not shown) placed into inlet 26 and snap-off (frangible) tube end 30. The separation medium in such a column is typically wet and equilibrated with 0.1 N $HNO_3$. It is preferred that the average diameter of separation medium particles be about 100 to about 150 μm when a chromatographic column separation apparatus is prepared and used.

Figure 2:
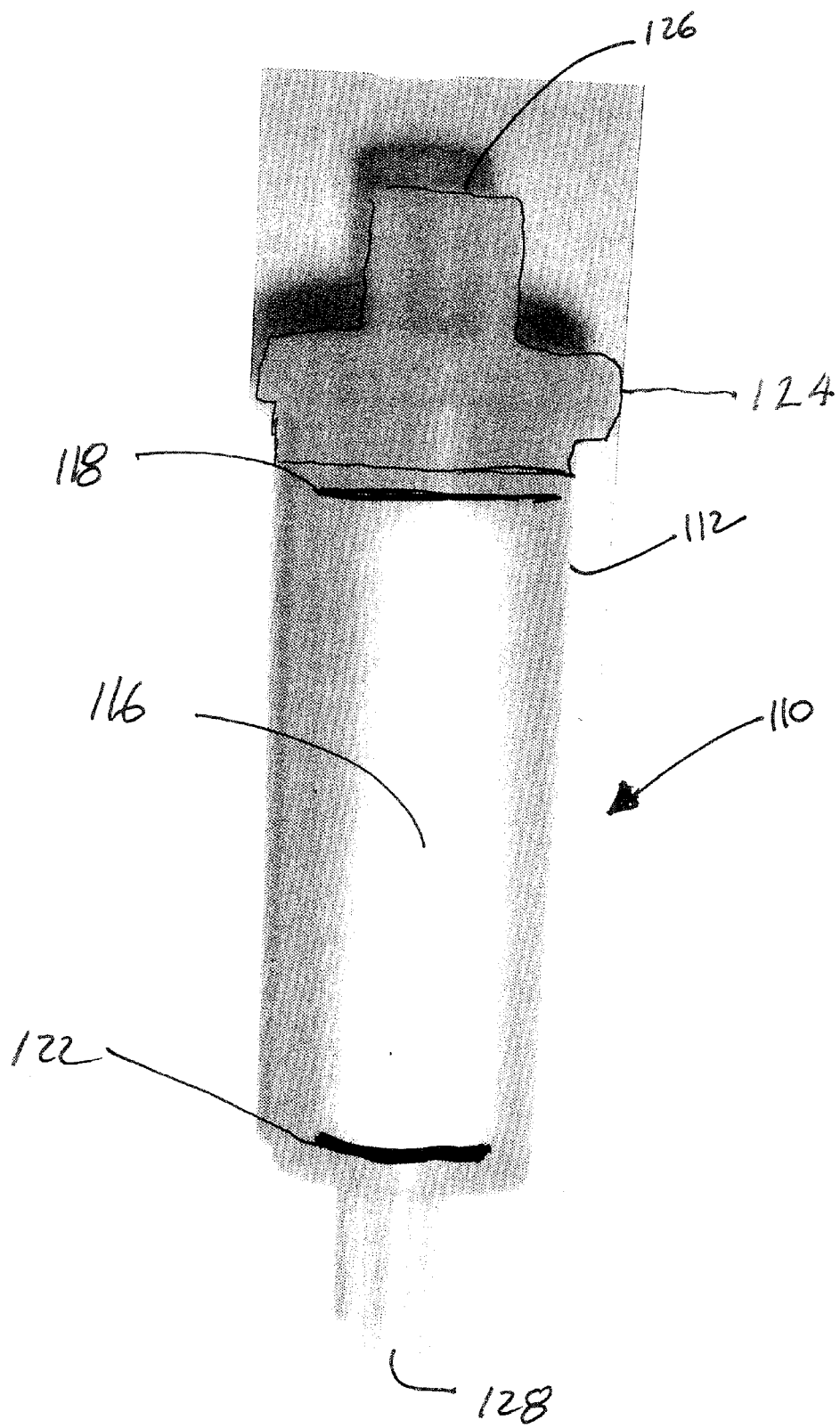
FIG. 2 shows schematic representation of another separation vessel useful in an embodiment of the invention.

FIG. 2 provides a second schematic drawing of another preferred separation apparatus. Here, the separation apparatus 110 is shown to include a support vessel as a cartridge 112 having an inlet 126 and an outlet 128 for liquid such as water. A cap 124 is preferably integrally molded with the inlet 126. The outlet 128 is preferably integrally molded with the cartridge 112. The separation apparatus 110 contains a porous support such as a frit 122 that supports separation medium 116. An upper porous support such as a frit 118 helps to keep the separation medium in place during the introduction of an influent aqueous sample or eluting solution. A contemplated apparatus can also include a stopcock or other flow regulating device (not shown) at, near or in conjunction with the outlet 128 to assist in regulating flow through the apparatus.

A contemplated cartridge such as a separation vessel of FIG. 2 is typically provided with the separation medium in a dry state, or at least not wet with aqueous nitric acid. In addition, inlet 126 and outlet 128 are preferably standard fittings such as Luer fittings that are adapted for easy connection to other standard gas and/or liquid connections. It is also preferred that the average diameter of separation particles be about 50 to about 100 μm when a cartridge separation apparatus is prepared and used.

One contemplated separation apparatus such as that of FIG. 1 can be readily prepared by slurrying the separation medium in water or acidified water such as 0.1 normal nitric acid. The slurry is added onto a flow-permitting support element such as a frit in a vertically oriented support vessel such as a column. The separation medium is permitted to settle under the force of gravity and can be packed more densely using vibration, tapping or the like. Once a desired height of separation medium is achieved, any excess liquid is removed as by vacuum, a second flow-permitting element such as another frit is inserted into the column above the separation medium and the cap is added.

To prepare another chromatographic column that can be used for a contemplated separation, a portion of separation medium prepared as discussed above was slurried in 3 M nitric acid and aliquots of that slurry were transferred under nitrogen pressure to a 10 cm long glass Bio-Rad® column (1.4 mm inside diameter) equipped with polypropylene fittings manufactured under the trademark "Cheminert" by Chromatronix, Inc., Berkeley, Calif. When the desired bed height had been reached (corresponding to a bed volume of about 0.6 $cm^3$), the separation medium was resettled by backwashing. The separation medium was then rinsed with several bed volumes of 3 M nitric acid.

Chromatographic columns can similarly be prepared in other vessels such as 23 cm long glass Pasteur pipettes having a small glass wool plug (porous support) in the bottom and a layer of 80/100 mesh glass beads on top of the separation medium to prevent disruption of the bed by sample introduction. Because these pipettes lack a liquid-holding reservoir, sample solutions were introduced using a small polyethylene funnel attached to the top of the pipette via a short length of vinyl tubing. See, Dietz et al., (1996) *J. Chem. Ed.,* 73(2):182–184.

A separation vessel shown in FIG. 2 can be prepared by adding a predetermined weight of dry separation medium to the cartridge 112 containing molded outlet 128 and support frit 122. The thus filled cartridge is vibrated in a vertical orientation to achieve a constant height for the separation medium bed, the upper porous support 118 is inserted, and the cap 124 containing molded fluid inlet 126 is placed onto the device.

The sorption of various radioisotopes from nitric acid solution by a separation medium was initially measured by contacting a known volume (typically 1.0 mL) of a spiked acid solution of appropriate concentration with a known weight of medium. The ratio of the aqueous phase volume (mL) to the weight of the chromatographic materials (g) ranged from 70 to 180. (This ratio is determined primarily by the need to produce an easily measured decrease in the aqueous activity by contact with the medium.) Although equilibrium is generally reached in under 20 minutes, a 2 hour mixing time was normally employed.

The mixing of the solid and liquid phases was performed using small magnetic bars rotated at such a speed (about 200 rpm) that the resin was suspended in the aqueous phase. After equilibration, the phases were centrifuged and the aqueous phase withdrawn from the centrifuge tube. To ensure that the aqueous phase did not contain any dispersed resin, it was also filtered through Whatman® #1 paper after centrifugation. Weight partition ratios were calculated from the following equation:

$$D_w = \left(\frac{A_o - A_s}{W}\right) / \left(\frac{A_s}{V}\right)$$

where $A_o$ and $A_s$ are the aqueous activities (cpm) before and after equilibration, respectively, W is the weight of resin (g) and v is the aqueous phase volume (mL). The $D_w$ values can be converted to the number of free column volumes to peak maximum (i.e., the resin capacity factor), k', by dividing by approximately 2.19. This factor includes the conversion of $D_w$ to D (a volume partition ratio) and the value of the ratio of the volume of stationary phase ($v_a$) to the volume of mobile phase ($v_m$), $v_a/v_m$, typically observed for chromatographic columns packed with the strontium-selective resin. (The term "stationary phase" refers to the volume of liquid extracting solution contained in the pores of the support.)

Partition ratios for alkaline earth cations were measured radiometrically using conventional procedures, and all measurements were performed at 23±2° C. Gamma and beta counting were performed on a Beckmann® Biogamma Counter and a Packard® Model 2200 Liquid Scintillation Counter, respectively. Assessment of non-radioactive elements was performed using well-known inductively-coupled plasma atomic emission spectroscopy.

Each of the patents and articles cited herein is incorporated by reference. The use of the article "a" or "an" is intended to include one or more.

The foregoing description and the examples are intended as illustrative and are not to be taken as limiting. Still other variations within the spirit and scope of this invention are possible and will readily present themselves to those skilled in the art.

What is claimed:

1. A separation medium comprising a Crown ether dispersed onto an inert, porous support, said Crown ether being a 4,4'(5')[$C_4$–$C_8$-alkylcyclohexano]-18-Crown-6 that exhibits a partition ratio between n-octanol and 1 M nitric acid of about $10^3$ to about $10^6$, said separation medium being free-flowing particles that are free of a diluent for said Crown ether.

2. The separation medium according to claim 1 wherein said inert, porous support is a resin.

3. The separation medium according to claim 2 wherein said resin is macroreticular.

4. The separation medium according to claim 1 wherein said inert, porous support is glass.

5. The separation medium according to claim 1 wherein said Crown ether comprises about 10 to about 40 weight percent of the total dry weight of the separation medium.

6. The separation medium according to claim 1 wherein said Crown ether is di-t-butyl-dicyclohexyl-18-Crown-6.

7. A separation medium comprising a Crown ether dispersed onto an inert macroreticular resin support, said Crown ether being di-t-butyl-dicyclohexyl-18-Crown-6, said separation medium being free-flowing and free of a diluent for said Crown ether, said Crown ether comprising about 10 to about 40 weight percent of the total dry weight of the separation medium.

8. The separation medium according to claim 7 wherein said inert macroreticular resin substrate exhibits a water regain of about 0.75 to about 3.0.

9. A method for separating alkaline earth cations from an aqueous sample comprising the steps of:
(a) contacting a free-flowing separation medium of a di-4,4'(5')[$C_3$–$C_8$-alkylcyclohexano]-18-Crown-6 dispersed onto an inert, porous support with an acidic aqueous sample containing dissolved alkaline earth cations, wherein said separation medium is free of a diluent for said Crown ether and said Crown ether exhibits a partition ratio between n-octanol and 1 M nitric acid of about $10^3$ to about $10^6$;
(b) maintaining said contact for a time period sufficient for the alkaline earth cations to be extracted from the sample solution to the separation medium to form a solid phase-loaded separation medium and a liquid phase alkaline earth cation-depleted sample; and
(c) separating said solid and liquid phases.

10. The method according to claim 9 wherein said acidic aqueous sample contains strontium cations and calcium cations.

11. The method according to claim 9 wherein said acidic aqueous sample contains barium cations and radium cations.

12. The method according to claim 9 further including the step of selectively eluting alkaline earth cations from said loaded separation medium.

13. The method according to claim 12 wherein strontium cations are said alkaline earth cations and are eluted by contacting said loaded separation medium with water or dilute nitric acid.

14. The method according to claim 9 further including the step of detecting the presence and quantity of said separated alkaline earth cations.

15. The method according to claim 9 wherein said contacting of step (a) is carried out in a chromatographic separation column by passing said aqueous acidic sample solution through a chromatographic separation column containing said separation medium.

16. The method according to claim 9 wherein strontium cations are loaded on said separation medium and are eluted from said loaded separation medium by passing an aqueous liquid having a pH value of 1 or more through the loaded separation medium in a separation column.

17. The method according to claim 9 wherein said Crown ether is di-t-butyl-dicyclohexyl-18-Crown-6.

18. The method according to claim 9 wherein said inert, porous support is a resin.

19. The method according to claim 18 wherein said resin is macroreticular.

20. The method according to claim 19 wherein said macroreticular resin exhibits a water regain of about 0.75 to about 3.0.

21. The method according to claim 9 wherein said inert, porous support is glass.

22. The method according to claim 9 wherein said Crown ether comprises about 10 to about 40 weight percent of the total dry weight of the separation medium.

23. A method for separating alkaline earth cations from an aqueous sample comprising the steps of:
(a) passing an acidic aqueous sample containing dissolved alkaline earth cations into a separation apparatus comprising a separation vessel that contains separation medium to contact said separation medium with said aqueous acidic sample solution, said separation medium comprising di-t-butyl-dicyclohexyl-18-Crown-6 dispersed onto an inert, porous, particulate macroreticular resin support, said separation medium being free-flowing when dry and free of a diluent for said Crown ether;
(b) maintaining said contact for a time period sufficient for the alkaline earth cations to be extracted from the sample solution to the separation medium to form a solid phase-loaded separation medium and a liquid phase alkaline earth cation-depleted sample;
(c) separating said solid and liquid phases; and
(d) eluting said alkaline earth cations from said loaded separation medium by passing an aqueous composition having a pH value of 1 or greater through the loaded separation medium in said separation apparatus.

24. The method according to claim 23 wherein said macroreticular resin exhibits a water regain of about 0.75 to about 3.0.

25. The method according to claim 23 wherein said Crown ether comprises about 10 to about 40 weight percent of the total dry weight of the separation medium.

26. The method according to claim 23 wherein said alkaline earth cation is strontium.

27. The method according to claim 23 wherein said alkaline earth cation is barium.

28. An apparatus for separating alkaline earth cations from an acidic aqueous sample that comprises:
a vessel having an inlet, an outlet and separation medium in a separation medium-containing region;
said separation medium comprising a Crown ether dispersed onto an inert, porous support, said Crown ether being a 4,4'(5')[$C_4$–$C_8$-alkylcyclohexano]-18-Crown-6 that exhibits a partition ratio between n-octanol and 1

M nitric acid of about 1 to about $10^6$, said separation medium being free-flowing particles that are free of a diluent for said Crown ether;

wherein the medium is supported and contained within the medium-containing region.

29. The separation apparatus according to claim 28 wherein said vessel includes a first flow-permitting support positioned between the outlet and the medium-containing region.

30. The separation apparatus according to claim 29 wherein said vessel includes a second flow-permitting support positioned between the inlet and the medium-containing region.

31. The separation apparatus according to claim 28 wherein said inlet and outlet are separated from each other.

32. The separation apparatus according to claim 31 wherein said the inlet and outlet are at opposite ends of the apparatus.

33. The separation apparatus according to claim 28 wherein said separation medium comprises di-t-butyl-dicyclohexyl-18-Crown-6 dispersed onto an inert macroreticular resin support.

34. The separation apparatus according to claim 33 wherein said Crown ether comprises about 10 to about 40 weight percent of the total dry weight of the separation medium.

35. The separation apparatus according to claim 28 wherein said inlet is integrally molded into a cap.

* * * * *